United States Patent
Wen

(10) Patent No.: US 9,220,338 B2
(45) Date of Patent: Dec. 29, 2015

(54) FOLDABLE TABLE MECHANISM

(75) Inventor: Hao Wen, Shanghai (CN)

(73) Assignee: Shanghai Kunjek Handtools and Hardware Co., Ltd., Shanghai (CN)

( * ) Notice: Subject to any disclaimer, the term of this patent is extended or adjusted under 35 U.S.C. 154(b) by 0 days.

(21) Appl. No.: 14/350,553

(22) PCT Filed: Jan. 16, 2012

(86) PCT No.: PCT/CN2012/000075
§ 371 (c)(1),
(2), (4) Date: Jul. 2, 2014

(87) PCT Pub. No.: WO2013/053188
PCT Pub. Date: Apr. 18, 2013

(65) Prior Publication Data
US 2014/0338574 A1    Nov. 20, 2014

(30) Foreign Application Priority Data
Oct. 11, 2011    (CN) .......................... 2011 1 0306521

(51) Int. Cl.
| A47B 3/00 | (2006.01) |
| A47B 31/04 | (2006.01) |
| A47B 43/00 | (2006.01) |
| B62B 3/02 | (2006.01) |
| A47B 31/00 | (2006.01) |

(52) U.S. Cl.
CPC ................ *A47B 31/04* (2013.01); *A47B 43/00* (2013.01); *B62B 3/022* (2013.01); *A47B 2031/003* (2013.01); *B62B 2205/20* (2013.01); *B62B 2205/24* (2013.01)

(58) Field of Classification Search
CPC .......... A47B 31/04; A47B 43/00; A47B 3/00; A47B 3/002
See application file for complete search history.

(56) References Cited

U.S. PATENT DOCUMENTS
1,769,140 A * 7/1930 Kaufman ...................... 211/202
1,771,782 A * 7/1930 Gese .............................. 108/65
(Continued)

FOREIGN PATENT DOCUMENTS
CN         2397797 Y      9/2000
CN       201290448 Y      8/2009
(Continued)

OTHER PUBLICATIONS

International Search Report for application No. PCT/CN2012/000075 dated Jul. 26, 2012.

*Primary Examiner* — Daniel Rohrhoff
(74) *Attorney, Agent, or Firm* — Patterson & Sheridan LLP

(57) ABSTRACT

The present invention relates to a foldable table mechanism that is convenient to transport. The foldable table mechanism includes table tops and a foldable mechanism. The foldable mechanism includes at least one shelve unit and a plurality of support legs. The support legs include a plurality of movable units. The movable units are pivotably connected. The shelve unit is disposed between the table tops. The shelve unit is movably connected to the movable units. The support legs support and secure the table tops at an open position and are stored between the table tops at a folded position. The present invention is simple in structure, foldable and flexible to use, convenient to carry and transport, thus suitable to use in small space, such as in household setting, small food service areas, and also suitable to use for outdoor activities because it is easy to transport.

29 Claims, 7 Drawing Sheets

(56) References Cited

U.S. PATENT DOCUMENTS

| | | | |
|---|---|---|---|
| 1,930,176 A | 10/1933 | Metzler | |
| 3,161,298 A * | 12/1964 | Naslund | 211/104 |
| 3,261,308 A * | 7/1966 | Szymber | 108/145 |
| 4,740,010 A * | 4/1988 | Moskovitz | 280/641 |
| 5,941,400 A * | 8/1999 | Lemaire | 211/201 |
| 2008/0166503 A1* | 7/2008 | Fu | 428/12 |
| 2010/0326938 A1* | 12/2010 | Zhu et al. | 211/149 |
| 2011/0062058 A1* | 3/2011 | Rogel et al. | 208/48 R |
| 2011/0174754 A1* | 7/2011 | Entz | 211/202 |
| 2011/0253660 A1* | 10/2011 | Pong | 211/198 |
| 2013/0099642 A1* | 4/2013 | Wehner et al. | 312/237 |

FOREIGN PATENT DOCUMENTS

| | | |
|---|---|---|
| CN | 201782294 U | 4/2011 |
| JP | 64-42965 U | 3/1989 |
| WO | 2010151323 A1 | 12/2010 |

* cited by examiner

FOLDABLE TABLE MECHANISM

TECHNICAL FIELD

The present invention relates to foldable mechanism, more particularly relates to a foldable table mechanism.

BACKGROUND

Currently, the state-of-the-art food carts usually include two or more shelves fixedly coupled to support legs. The current food carts have fixed volume and take up space even when not in use. When space is limited, such as in a family environment or small dining areas, or when transportation is required, the state-of-the-art food carts are not convenient to use or carry because they occupy large space, are bulky and heavy, and unable to reduce volume.

DISCLOSURE OF THE INVENTION

The present invention provides a foldable table mechanism to solve the technical problems in existing food carts, namely the problems of inconvenient to use or carry around due to large in volume, bulky and heavy, and unable to reduce volume.

The present invention provides a foldable table mechanism. The foldable table mechanism includes table tops and a folding assembly. The folding assembly includes at least one shelve unit and a plurality of support legs. Each support leg comprises movable units. The movable units are pivotably connected together. The shelve unit is disposed between the table tops. The shelve unit is movably coupled to the movable units. The support legs support and secure the table tops at an open position and are stored between the table tops at a folded position.

The foldable table mechanism further includes a locking assembly for switching the movable units between the open position and the folded position.

Further, the locking mechanism includes a locking pole. The movable units that are locked with each other include an upper movable unit and a lower movable unit according to relative locations of the movable units at the open position. The locking pole is disposed in a hollow section of the upper movable unit. The locking pole is movable to extend into a first receiving unit of the lower movable unit.

The present invention further provides a folding mechanism. The folding mechanism includes a shelve unit, and a plurality of support legs. Each support leg comprises movable units. The movable units are pivotably connected. The shelve unit is movably coupled to the movable units. The movable units form supporting poles at an open position. The movable units are connected in a parallel manner at a folded position.

The present invention further includes a foldable table mechanism. The foldable table mechanism includes an upper table top, a lower table top, and a folding assembly disposed between the upper table top and the lower table top. The folding assembly includes at least one shelve unit, and a plurality of support legs. Each support leg includes movable units. The movable units are pivotably connected. The shelve unit is disposed between the upper table top and the lower table top. The shelve unit is movably coupled to the movable units. The support legs support and secure the table tops at an open position and are stored between the upper table top and the lower table top at a folded position.

Compared with the existing technology, embodiment of the present invention is simple in structure, foldable and flexible to use, convenient to carry and transport, thus suitable to use in small space, such as in household setting, small food service areas, and also suitable to use for outdoor activities because it is easy to transport.

DETAILED DESCRIPTION

The present invention is described in detail below in association with the drawings.

Figure 1:
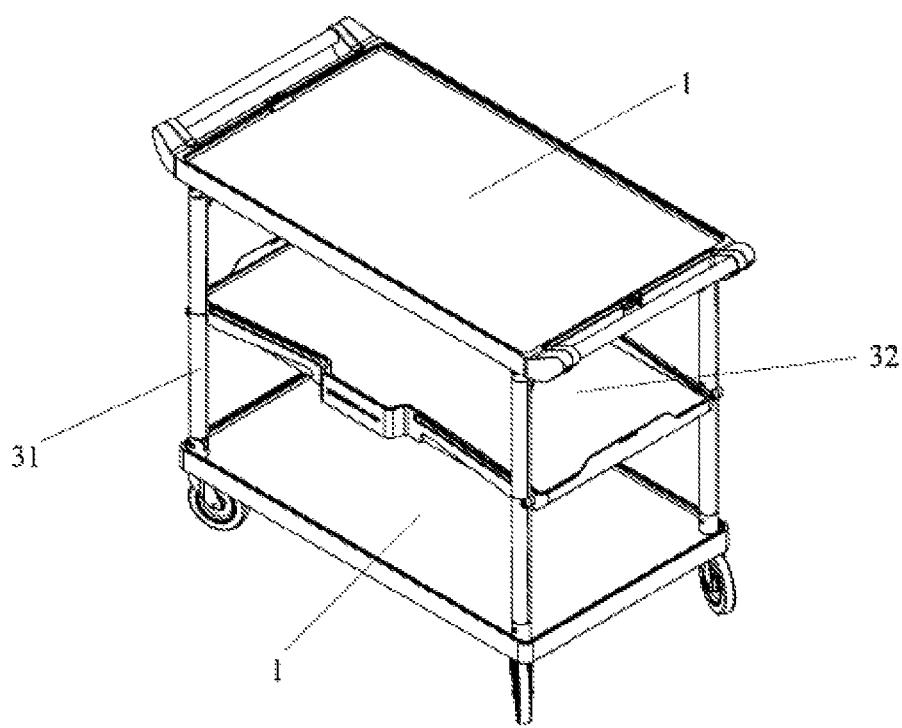
FIG. 1 is a schematic perspective view of a foldable table mechanism according to one embodiment of the present invention.
Figure 3:
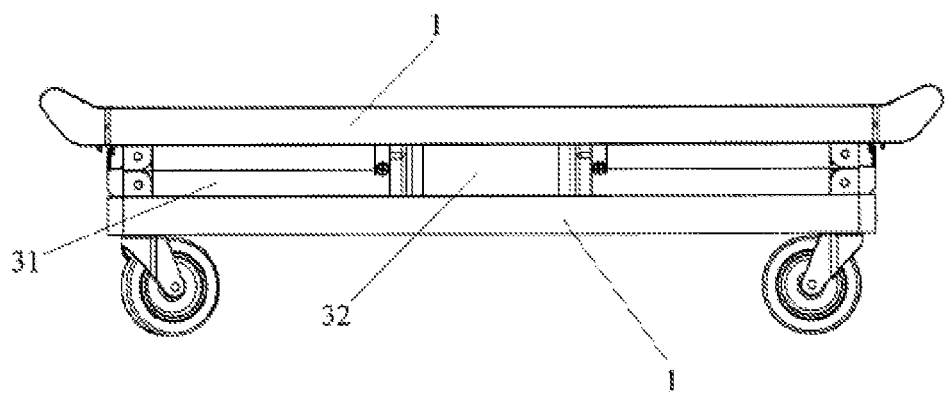
FIG. 3 is a schematic view of the foldable table mechanism in a folded position.

As shown in FIG. 1, the foldable table mechanism of the present invention includes table tops 1 and a folding mechanism. The folding mechanism includes at least one shelve unit 32 and a plurality of support legs 31. The support leg 31 includes a plurality of movable units pivotably connected. The shelve unit 32 is positioned between the table tops 1. The shelve unit 32 is movably connected to the movable units. The support legs support and secure the table tops 1 at the open position, as shown in FIG. 1. The support legs are stored between the table tops 1 at the folded position, as shown in FIG. 3. The present invention further includes a locking assembly used to switch the movable units between the open position and the closed position.

Figure 4:
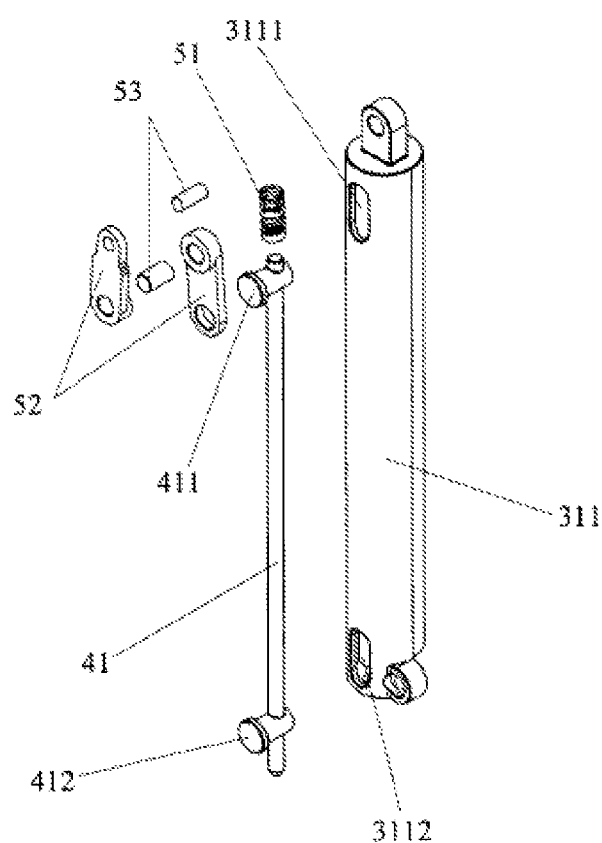
FIG. 4 is a schematic exploded view of a locking assembly.
Figure 5:
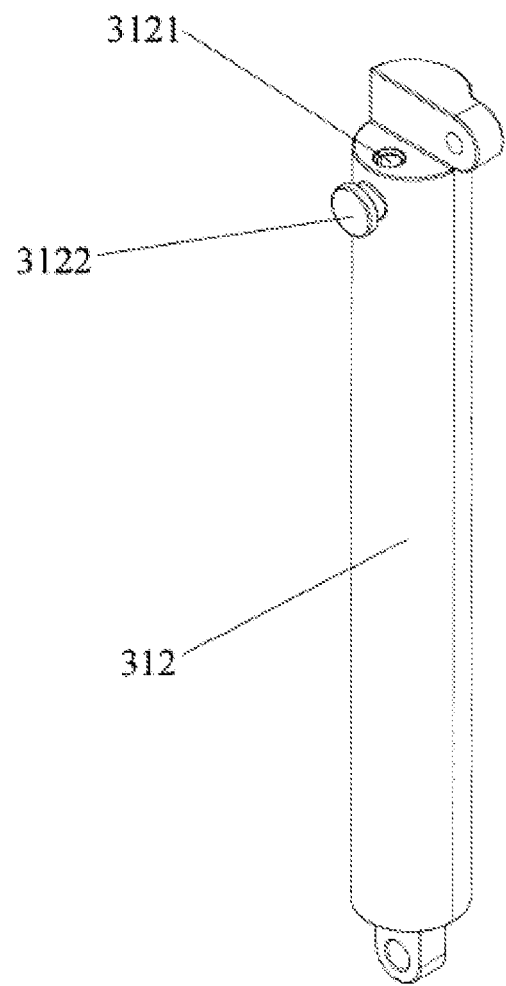
FIG. 5 is a schematic view of a lower movable unit.

One embodiment of the locking assembly is described below. However, the present invention is not limited to this embodiment. As shown in FIGS. 4 and 5, the locking assembly includes a locking pole 41. The movable units that may be locked with each other are an upper movable unit 311 and a lower movable unit 312 according to relative locations at the open position. The locking pole 41 is movably disposed in a hollow section of the upper movable unit 311. The locking pole 41 can move and extend into a first receiving unit 3121 of the lower movable unit 312. The first receiving unit 3121 may be a first receiving hole or a first receiving slot formed in the lower movable unit.

The present invention further includes a trigger assembly to trigger the locking assembly to open or fold. The trigger assembly provides convenience in the operation of opening and folding the movable units. The trigger assembly is connected to the locking assembly.

An embodiment of the trigger assembly is described below. However, the present invention is not limited to this embodiment. The trigger assembly includes a spring body 51 and a trigger unit connected to the spring body 51. In the present embodiment, the spring body 51 is a spring. A lower end of the spring encircles the locking pole 41. The spring is at natural state when the spring pushes the locking pole 41 to extend into the lower movable unit 312. The spring is at a compressed state when the spring secures and separates the locking pole 41 from the lower movable unit 312.

Figure 6:
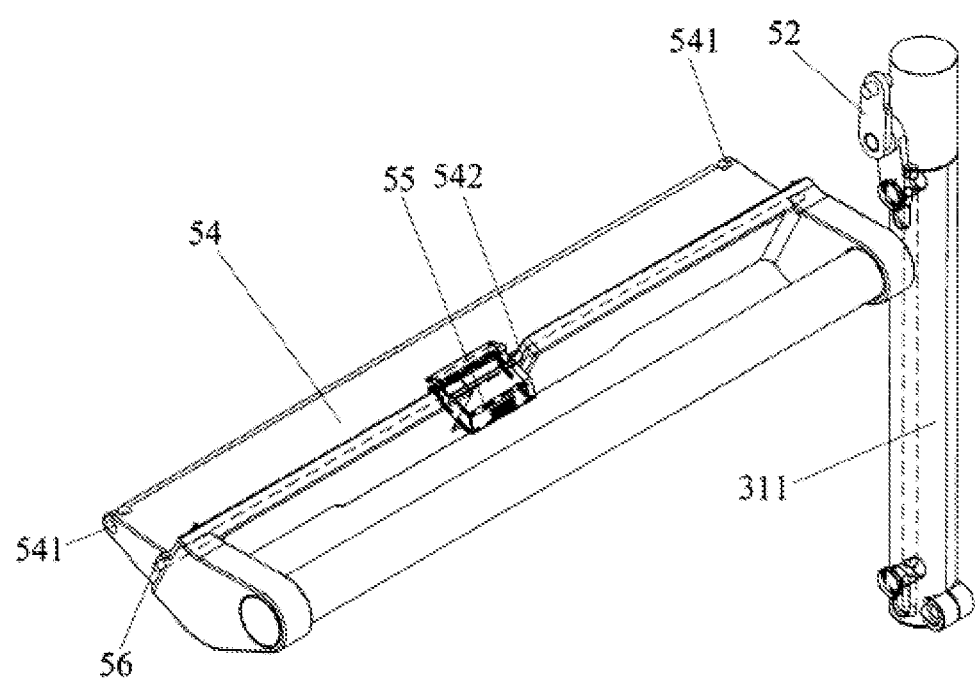
FIG. 6 is a schematic perspective view of a locking assembly and a trigger assembly.
Figure 7:
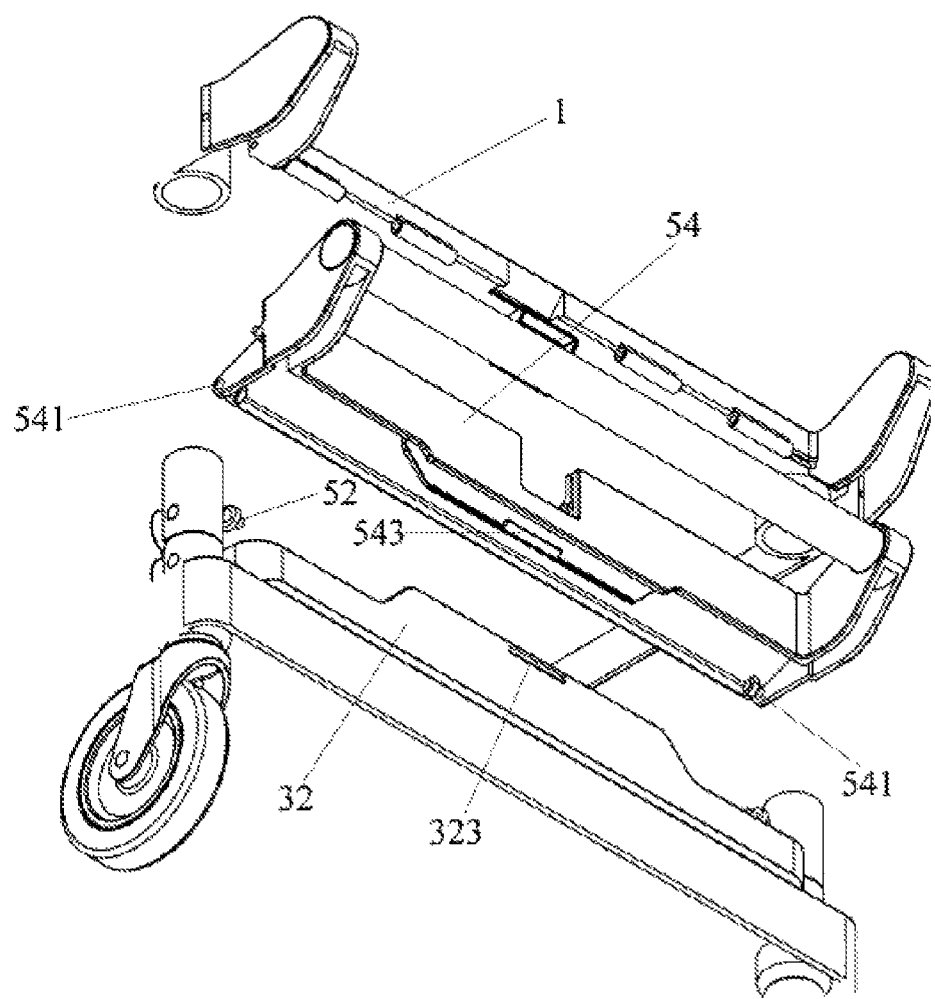
FIG. 7 is a schematic perspective view of a fastening assembly.
Figure 8:
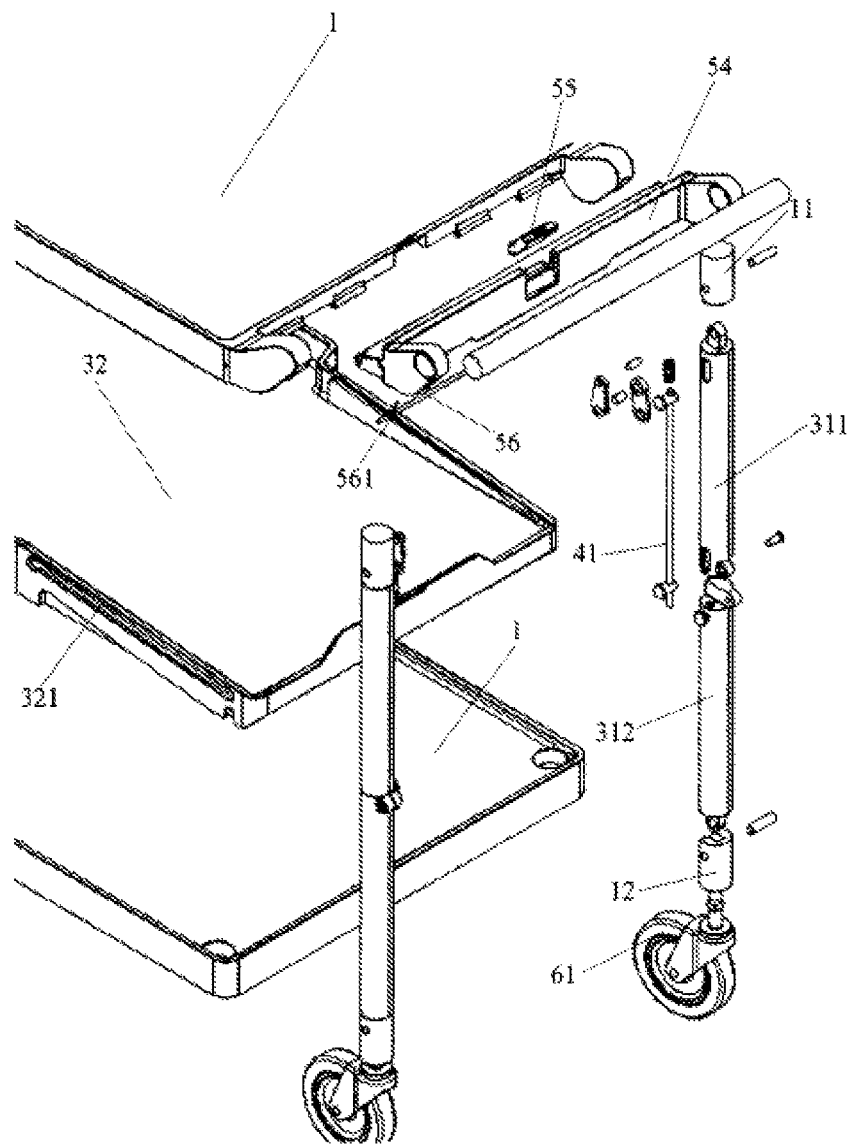
FIG. 8 is a schematic partial exploded view of the foldable table assembly.

An embodiment of the trigger unit is described below. However, the present invention is not limited to this embodiment. The trigger unit further includes an upper fastener 411 fixedly disposed at an upper end of the locking pole 41, a plurality of hinge elements 52 and a handrail assembly. The handrail assembly includes a handrail body 54 and a locking block 55. The handrail body 54 has a recess opening 542. The locking block 55 is disposed in the recess opening 542. The handrail body 54 and the locking block 55 are connected to the table top 1 through a pivot shaft 56. A coil spring 561 is disposed on the pivot shaft 56 as shown in FIG. 8. The upper fastener 411 extends horizontally into the locking pole 41. The hinge elements 52 are fixedly encased around the upper fastener 411. The hinge elements 52 are connected to one another by pins 52. Openings 541 are formed at two ends of the handrail body 54 to connect with the hinge elements 52. The locking block 55 rotates about the pivot shaft 56 and drives the upper fastener 411 to move up and down within a first through hole 3111 formed in a sidewall of the upper movable unit 311, as shown in FIGS. 4 and 6.

Figure 2:
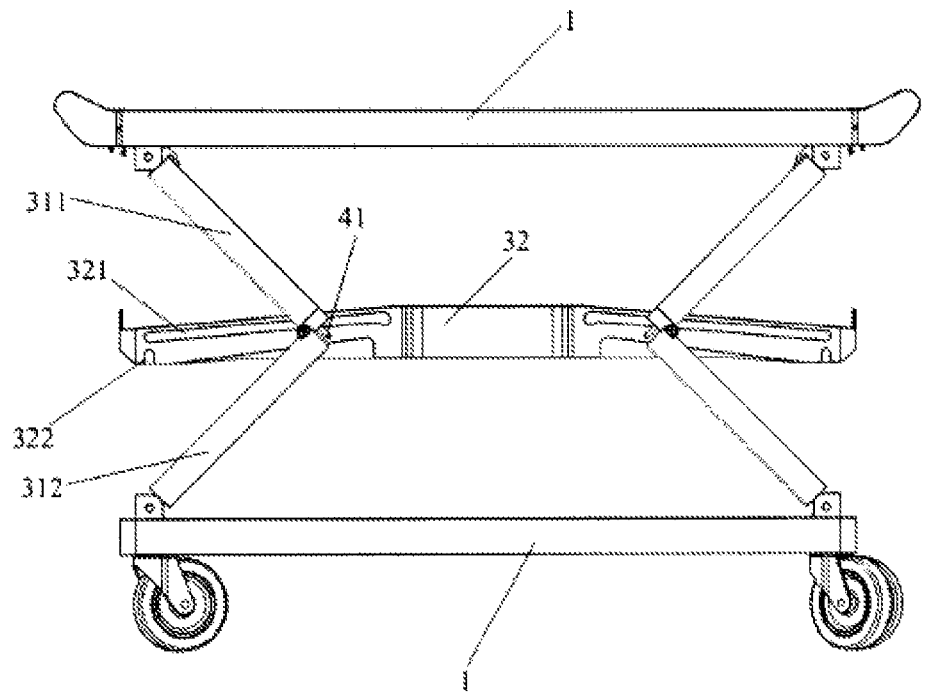
FIG. 2 is a schematic view of the foldable table mechanism during folding.

An elongated opening 321 is formed on the side of the shelve unit 32. A guide body may be disposed in one of the movable units. The guide body may be fastened into the elongated opening 321 and slide along the elongated opening 321. The guide body may be a lower fastener 412 fixed on a lower end of the locking pole 41. The lower fastener 412 extends horizontally into the locking pole 41 and may move up and down within a second through hole 3112 formed through the sidewall of the upper movable unit 311, as shown in FIGS. 2 and 5. The length of the elongated opening 321 may be equal to or greater than the length of the movable units. This is only one embodiment of the movable connection between the shelve unit 32 and the movable units. However, the present invention is not limited to this embodiment.

The present invention further includes a fastening assembly for securing the shelve unit and the movable units when the support legs are at the open position to insure that the shelve unit is securely connected. In the present embodiment, the fastening assembly includes a fastening block 3122 disposed on an upper end of a sidewall of the movable unit. A notch 322 is formed in the shelve unit 32 at a corresponding location. The fastening block 3122 may be removed from or inserted into the notch 322, as shown in FIGS. 2 and 5. This is only one embodiment of the fastening assembly. However, the present invention is not limited to this embodiment.

When there are three or more movable units, the shelve unit may be positioned below the first movable unit and one additional shelve unit may be disposed for every two movable units. At folded position, the movable units are parellel to the shelve units.

The support leg further includes an upper post 11 and a lower post 12. An upper end of the upper post 11 is coupled to the table top and a lower end of the upper post 11 is pivotally connected to a movable unit. An upper end of the lower post 12 is pivotably connected to a movable unit and the lower end of the lower post 12 is connected to the table top. A plurality of casters 61 may be disposed below the table top.

The foldable table mechanism of the present invention may be used for a workbench, a table, or a cart.

The present invention provides a foldable mechanism. The foldable mechanism includes at least one shelve unit and a plurality of support legs. Each support leg includes two or more movable units. The movable units may be pivotably connected. The shelve unit is movably connected to the movable units. At an open position, the movable units form a support pole. At a folded position, the movable units are connected to each other in a parallel manner.

The present invention also provides a locking assembly for switching the movable units between an open position and a folded position. The locking assembly includes a locking pole. The movable units that are locked with each other may include an upper movable unit and a lower movable unit according to relative locations of the movable units at the open position. The locking pole is disposed in a hollow section of the upper movable unit. The locking pole may move and extend into a first receiving unit of the lower movable unit.

The present invention provides a foldable table mechanism. The foldable table mechanism includes at least an upper table top, a lower table top and a folding mechanism disposed between the upper table top and the lower table top. The folding mechanism includes at least one shelve unit and a plurality of support legs. Each support leg includes two or more movable units. The movable units are pivotably connected. The shelve unit is position between the upper table top and the lower table top. The shelve unit is movably connected to the movable units. At the opening position, the folding assembly secures and supports the upper table top. At the folded position, the folding assembly is stored between the upper table top and the lower table top.

To operate, rotate the locking block 55 to drive the hinge elements 52 to lift the locking pole 41; release the locking block 55 after the movable units are opened and form support poles so that the locking pole 41 enters into the first receiving unit 3121 in the lower movable unit 312 under the force of the spring 51, thus locking in position. At the same time, the fastening block 3122 on the upper sidewall of the movable unit is locked into the notch 322 of the shelve unit 32 to secure the shelve unit 32. The foldable table mechanism of the present invention is then ready for use. When not in use, rotate the locking block 55 to drive the hinge elements 52 to lift the locking pole 41 so that the locking pole 41 slides out of the first receiving unit 3121 of the lower movable unit 312 causing the movable units to fold. When the movable units are parellel to one another, a notch 323 on the shelve unit 32 and a protruding body 543 of the handrail body 54 match and connect to prevent the folded folding assembly between the upper table top and lower table top to open automatically, thus, locking the foldable table mechanism in position. Thus, the foldable table mechanism is ready for being carried or transported.

The foldable table mechanism of the present invention is simple in structure, foldable and flexible to use, convenient for carrying and transporting, suitable for small space, such as in household, small food service areas, and other places, and also suitable for moving around during outdoor activities.

The above disclosure is only one embodiment of the present invention. The present invention is not limited to the above embodiment. Any change devised by persons skilled in the art falls within the scope of protection of the present invention.

The invention claimed is:

1. A foldable table mechanism, comprising:
   table tops; and
   a folding assembly, wherein the folding assembly comprises:
      at least one shelve unit; and
      a plurality of support legs, wherein each support leg comprises:
         an upper movable unit;
         a lower movable unit, wherein the upper and lower movable units are pivotably connected to each other, the shelve unit is disposed between the table tops, the shelve unit is movably coupled to the upper and lower movable units, and the support legs support and secure the table tops at an open position and are stored between the table tops at a folded position; and a locking pole disposed on the upper movable unit, wherein the locking pole is movable to extend into a receiving unit of the lower movable unit.

2. The foldable table mechanism of claim 1, further comprising a locking assembly for switching the upper and lower movable units between the open position and the folded position.

3. The foldable table mechanism of claim 2, wherein the locking assembly comprises the locking pole, the upper and lower movable units that are locked with each other at the open position, and the locking pole is disposed in a hollow section of the upper movable unit.

4. The foldable table mechanism of claim 3, wherein the receiving unit is a receiving hole or a receiving slot.

5. The foldable table mechanism of claim 2, further comprising a trigger assembly to trigger the locking assembly to open or fold, wherein the trigger assembly is connected to the locking assembly.

6. The foldable table mechanism of claim 5, wherein the trigger assembly comprises a spring body and a trigger unit connected to compress the spring body, a lower end of the spring body encases the locking pole, when the spring body is at natural state, the spring body secures the locking pole by inserting the locking pole into the lower movable unit, and when the spring body is at compressed state, the spring body secures the locking pole by removing the locking pole from the lower movable unit.

7. The foldable table mechanism of claim 6, wherein the trigger assembly further comprises:
an upper fastener;
hinge elements; and
a handrail assembly, wherein the handrail assembly comprises:
a handrail body; and
a locking block, wherein the handrail body and the locking block are connected to the table top by a pivot shaft, the upper fastener is connected to the handrail body by the hinge elements, and the locking block moves the upper fastener up and down along a first through hole formed in a sidewall of the upper movable unit.

8. The foldable table mechanism of claim 7, wherein the hinge elements are connected to one another by pins.

9. The foldable table mechanism of claim 7, wherein the hinge elements are fixedly encased around the upper fastener.

10. The foldable table mechanism of claim 7, wherein a spring is disposed on the pivot shaft, and the locking block rotates about the pivot shaft to drive the upper fastener to move up and down.

11. The foldable table mechanism of claim 10, wherein the spring is a coil spring.

12. The foldable table mechanism of claim 10, wherein receiving holes are formed through two ends of the handrail body to connect with the hinge elements.

13. The foldable table mechanism of claim 7, further comprising a locking assembly to secure the shelve unit and the table top when the support legs are at the folded position.

14. The foldable table mechanism of claim 13, wherein the locking assembly comprises a notch hole or a notch slot formed on the shelve unit and a corresponding protruding body formed on the handrail body.

15. The foldable table mechanism of claim 1, wherein an elongated opening is formed on a side of the shelve unit, a guide body is disposed in one of the upper and lower movable units, and the guide body is fastened to the elongated opening and slides along the elongated opening.

16. The foldable table mechanism of claim 15, wherein a length of the elongated opening is equal to or greater than a length of the upper movable unit or the lower movable unit.

17. The foldable table mechanism of claim 1, further comprising a fastening assembly to secure the shelve unit and the upper and lower movable units when the support legs are at the open position.

18. The foldable table mechanism of claim 17, wherein the fastening assembly comprises:
a fastening block disposed on an upper end of a sidewall of the lower movable unit, a notch is formed in the shelve unit at a corresponding location so that the fastening block can be removed from or inserted into the notch.

19. The foldable table mechanism of claim 1, wherein the movable units comprise two or more pairs of upper and lower movable units, the shelve unit is disposed below a first upper movable unit, and an additional shelve unit is disposed in every pair of upper and lower movable units.

20. The foldable table mechanism of claim 1, wherein the upper and lower movable units are parallel to the table tops at the folded position.

21. The foldable table mechanism of claim 20, wherein the support leg further comprises an upper post, an upper end of the upper post is coupled to the table top, and a lower end of the upper post is pivotably coupled to the upper movable unit.

22. The foldable table mechanism of claim 21, wherein the support leg further comprises a lower post, an upper end of the lower post is pivotably coupled to the lower movable unit, and a lower end of the lower post is coupled to the table top.

23. The foldable table mechanism of claim 22, further comprising a plurality of casters disposed under the table top.

24. The foldable table mechanism of claim 1, wherein the table mechanism is a workbench, a table or a cart.

25. The foldable table mechanism of claim 1, wherein the shelve unit is parallel to the table tops.

26. A folding mechanism, comprising:
a shelve unit; and
a plurality of support legs, wherein each support leg comprises:
a first movable unit;
a second movable unit, wherein the first and second movable units are pivotably connected to each other, the shelve unit is movably coupled to the first and second movable units, the movable units form supporting poles at an open position, and the movable units are connected in a parallel manner at a folded position; and
a locking pole disposed on the first movable unit, wherein the locking pole is movable to extend into a receiving unit of the second movable unit.

27. The folding mechanism of claim 26, further comprising a locking assembly for switching the first and second movable units between the open position and the folded position.

28. The folding mechanism of claim 27, wherein the locking assembly comprises the locking pole, the first and second movable units that are locked with each other at the open position, the locking pole is disposed in a hollow section of the first movable unit.

29. A foldable table mechanism, comprising:
an upper table top;
a lower table top; and
a folding assembly disposed between the upper table top and the lower table top, wherein the folding assembly comprises:

at least one shelve unit; and a plurality of support legs, wherein each support leg comprises:

one or more pair of movable units, each pair of the movable units are pivotably connected to each other, the shelve unit is disposed between the upper table top and the lower table top, the shelve unit is movably coupled to the one or more pair of movable units, the support legs support and secure the table tops at an open position and are stored between the upper table top and the lower table top at a folded position;

a locking pole disposed on a first movable unit in each pair of movable units, wherein the locking pole is movable to extend into a receiving unit of a second movable unit of the pair of movable units.

\* \* \* \* \*